Patented May 1, 1934

1,957,155

UNITED STATES PATENT OFFICE 1,957,155

ESTERS DERIVED FROM SULPHONATED PHTHALIC ACIDS AND PROCESS OF MAKING SAME

Otto Albrecht, Basel, Switzerland, assignor to Society of Chemical Industry in Basle, Basel, Switzerland No Drawing. Application November 9, 1932, Serial No. 641,926. In Switzerland December 18, 1931

7 Claims. (Cl. 260—103)

This invention relates to an improvement in or modification of that described in U. S. Patent No. 1,935,264, dated Nov. 14, 1933. It refers to a process of making esters of sulphonated phthalic acids, and comprises both the manufacture thereof as well as the new esters themselves.

The manufacture of esters derived from sulphonated phthalic acids or their derivatives and phenolic compounds as described in the said patent, is apt to be accompanied by undesired by-products. For example, a red dyestuff is produced when phthalic acid anhydride-β-sulphonic acid is introduced into molten β-naphthol.

According to this invention, the formation of such undesired by-products can be minimized or avoided in a surprising manner when the ester is produced in the presence of suitable basic solvents or diluents, such as tertiary bases which do not yield colored condensation products with phthalic acid anhydride. Such bases are inter alia trimethylamine, triethylamine, pyridine, lepidine, collidine, quinoline, etc.

For making the esters one may start from sulphonated phthalic acids, such as phthalic acid-β-sulphonic acid or sulpho-4-chlorophthalic acid, or from their anhydrides or halides. As phenolic compounds there may be used, for example, monohydric or polyhydric phenols or naphthols or their derivatives, so far as a free hydroxyl group is contained in the compound; for instance, phenol, cresols, chloro-cresols, xylenols, naphthols, resorcinol-mono-alkylethers, hydroxy-naphthoic acid esters or other derivatives of hydroxynaphthoic acid. For the esterification, the sulphophthalic acid or their derivatives may be dissolved or suspended in suitable basic solvents and the solution or suspension may be thereupon heated with the phenolic compound. If the ester is to be obtained by way of the halide, the latter may be produced during the reaction with aid of phosphorus oxychloride.

The esters formed from the phenol compounds and sulphonated phthalic acids and their salts have a characteristic power of wetting, cleansing and emulsifying, and can be used either alone or together with soaps, substances resembling soaps or solvents for the manifold purposes of the textile industry.

In many cases, particularly if the phenolic residue contains halogen, there are obtained products which are excellent agents for the protection of animal fibers against insect and cryptogamic pests.

The following examples illustrate the invention, the parts being by weight:—

Example 1

11.4 parts of β-sulphophthalic acid-anhydride, which may be made, for example, by prolonged heating of the free acid in a vacuum at about 150–160° C., are dissolved in 22.8 parts of dry pyridine. To the solution thus obtained there are added 14.4 parts of β-naphthol and 5.6 parts of phosphorus oxychloride, and the whole is heated to boiling for some time. The product is introduced into water, neutralized with sodium carbonate while hot, filtered and salted out with sodium chloride. After drying, the salted out product separated from the liquid is a greyish powder, which in water determines very easy wetting.

Example 2

11.4 parts of β-sulphophthalic acid-anhydride are dissolved, while heating, in 11.4 parts of dry pyridine. To this solution are added, while hot, 13.8 parts of hydroquinone-mono-ethylether. The whole is then heated to boiling and there is run in, in the course of about 15 minutes, 5.1 part of phosphorus oxychloride. After the mixture has been kept boiling for some time, it is allowed to cool somewhat and stirred with about 30 parts of water. The oil which is thus precipitated, is separated from the supernatant liquor, neutralized and evaporated to dryness, preferably under diminished pressure. There is obtained a solid, grey product, which is dissolved by water to a solution that foams strongly when shaken. When the product is added to a carbonizing vat, the latter acquires a remarkable wetting power.

Example 3

45.6 parts of β-sulphophthalic acid-anhydride and 47.4 parts of dry pyridine are stirred together, while heating, until a homogeneous magma has been formed. To this there are added 51.4 parts of ortho-chlorophenol, the mixture is heated to 112° C. and there are gradually dropped into it at 112–120° C. 20.2 parts of phosphorus oxychloride. The mass is stirred for some hours at this said temperature and the latter is allowed finally to rise to 130–135° C. After cooling, the mass is stirred at about 50° C. with 75 parts of water and the precipitated oil is separated from the supernatant liquid. The oil is stirred with water and neutralized with sodium carbonate. From the solution thus obtained, which is clear while hot, the ester is salted out. The solid product separated from the liquor is dried, preferably under diminished pressure; it then forms a nearly colorless powder having a remarkable wetting power in, for example, a carbonizing acid.

Similar results are obtained if in the above example the ortho-chlorophenol is replaced by para-chlorophenol, chlorocresols, dichlorophenols, etc.

What I claim is:—

1. Process for the manufacture of esters derived from sulphonated phthalic acids and aromatic hydroxy-compounds in which the hydroxyl groups are bound to carbon atoms, consisting in heating the sulphonated phthalic acids with the aromatic hydroxy-compounds in the presence of tertiary bases of the pyridine series.

2. Process for the manufacture of esters derived from sulphonated phthalic acids and aromatic hydroxy-compounds in which the hydroxyl groups are bound to carbon atoms, consisting in heating the sulphonated phthalic acids with the aromatic hydroxy-compounds in the presence of pyridine.

3. Process for the manufacture of esters derived from sulphonated phthalic acids and phenols, consisting in heating the sulphonated phthalic acids with the phenols in the presence of pyridine.

4. Process for the manufacture of esters derived from sulphonated phthalic acids and chlorinated phenols, consisting in heating the sulphonated phthalic acids with the chlorinated phenols in the presence of pyridine.

5. The esters derived from sulphonated phthalic acids and halogenated phenols, which products, in the form of their sodium salts, form colorless powders which are readily soluble in water and the aqueous solutions of which have a strong capillary activity.

6. The esters derived from sulphonated phthalic acids and monochlorophenols, which products, in the form of their sodium salts, form colorless powders which are readily soluble in water and the aqueous solutions of which have a strong capillary activity.

7. The esters derived from sulphonated phthalic acid and ortho-chlorophenol, which product, in the form of its sodium salt, forms a colorless powder which is readily soluble in water and the aqueous solution of which has a strong capillary activity.

OTTO ALBRECHT.